United States Patent
Kolar et al.

(10) Patent No.: US 11,522,787 B1
(45) Date of Patent: Dec. 6, 2022

(54) PATH METRIC OSCILLATION ANALYSIS WITH SLA THRESHOLD ADJUSTMENT

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/538,214

(22) Filed: Nov. 30, 2021

(51) Int. Cl.
*G06F 15/16* (2006.01)
*H04L 45/12* (2022.01)
*H04L 45/00* (2022.01)
*H04L 43/0864* (2022.01)
*H04L 45/302* (2022.01)
*H04L 43/087* (2022.01)
*H04L 45/42* (2022.01)

(52) U.S. Cl.
CPC .......... *H04L 45/123* (2013.01); *H04L 43/087* (2013.01); *H04L 43/0864* (2013.01); *H04L 45/22* (2013.01); *H04L 45/302* (2013.01); *H04L 45/42* (2013.01)

(58) Field of Classification Search
CPC ............................. H04L 45/123; H04L 45/42
See application file for complete search history.

(56) References Cited

U.S. PATENT DOCUMENTS

| | | | | |
|---|---|---|---|---|
| 9,344,355 B2 * | 5/2016 | Vasseur | ................. | H04L 45/308 |
| 9,843,486 B2 * | 12/2017 | Feller | ................. | H04L 41/0681 |
| 10,171,380 B2 | 1/2019 | Apte et al. | | |
| 11,108,651 B1 * | 8/2021 | Mermoud | ............... | H04L 45/22 |
| 2013/0263200 A1 * | 10/2013 | Li | .................... | H04N 21/23418 |
| | | | | 725/116 |
| 2016/0308734 A1 * | 10/2016 | Feller | ................. | H04L 41/5009 |

FOREIGN PATENT DOCUMENTS

WO  2010045798 A1  4/2010

* cited by examiner

*Primary Examiner* — Hieu T Hoang
(74) *Attorney, Agent, or Firm* — Behmke Innovation Group LLC; Kenneth J. Heywood; Jonathon P. Western

(57) ABSTRACT

In one embodiment, a device detects oscillations in a path metric for a network path between violating a service level agreement for an online application and not violating the service level agreement for the online application. The device classifies the oscillations as near-boundary or wild, based on degrees to which the path metric violated a threshold of the service level agreement. The device provides data regarding the oscillations to a user interface that includes an indication as to whether the oscillations are near-boundary or wild. The device adjusts the threshold of the service level agreement based in part on feedback from the user interface, when the oscillations are near-boundary.

20 Claims, 18 Drawing Sheets

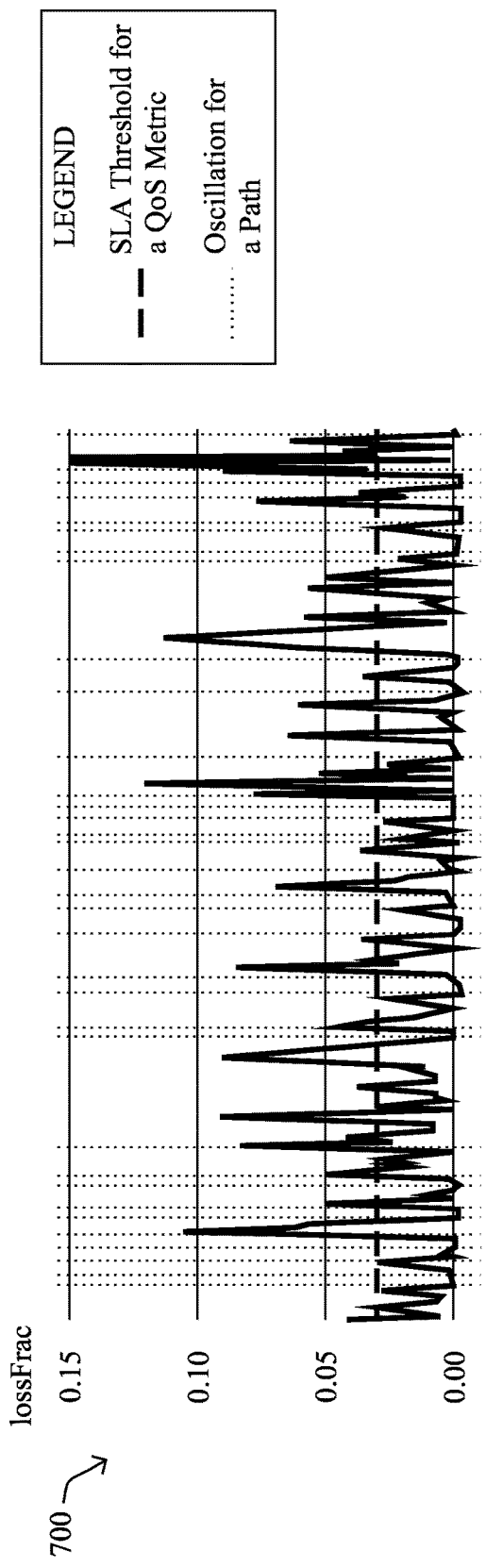
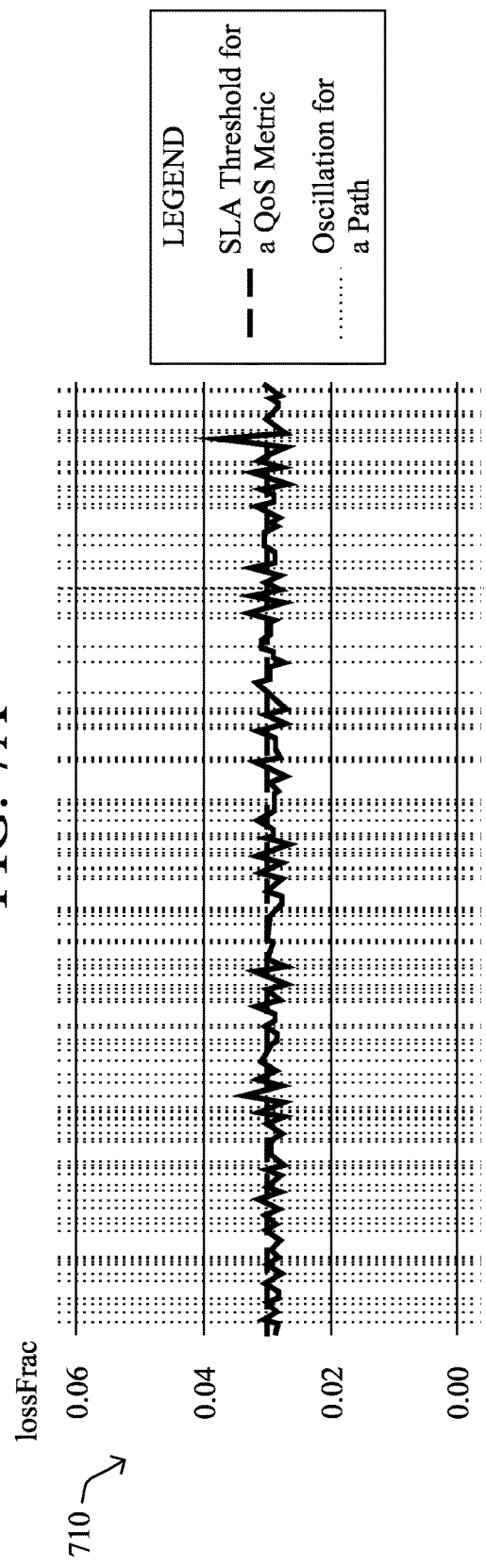
FIG. 7A
FIG. 7B

PATH METRIC OSCILLATION ANALYSIS WITH SLA THRESHOLD ADJUSTMENT

TECHNICAL FIELD

The present disclosure relates generally to computer networks, and, more particularly, to path metric oscillation analysis with service level agreement (SLA) threshold adjustment.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, certain paths have been found to exhibit behaviors where they oscillate between providing an acceptable application experience and not providing acceptable application experience. Such behaviors can cause a predictive routing mechanism to repeatedly recommend rerouting the application traffic, which can also impinge on the application experience.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7F illustrate plots of path metrics exhibiting near-boundary and wild behaviors;

DESCRIPTION OF EXAMPLE EMBODIMENTS

Overview

Figure 1A:
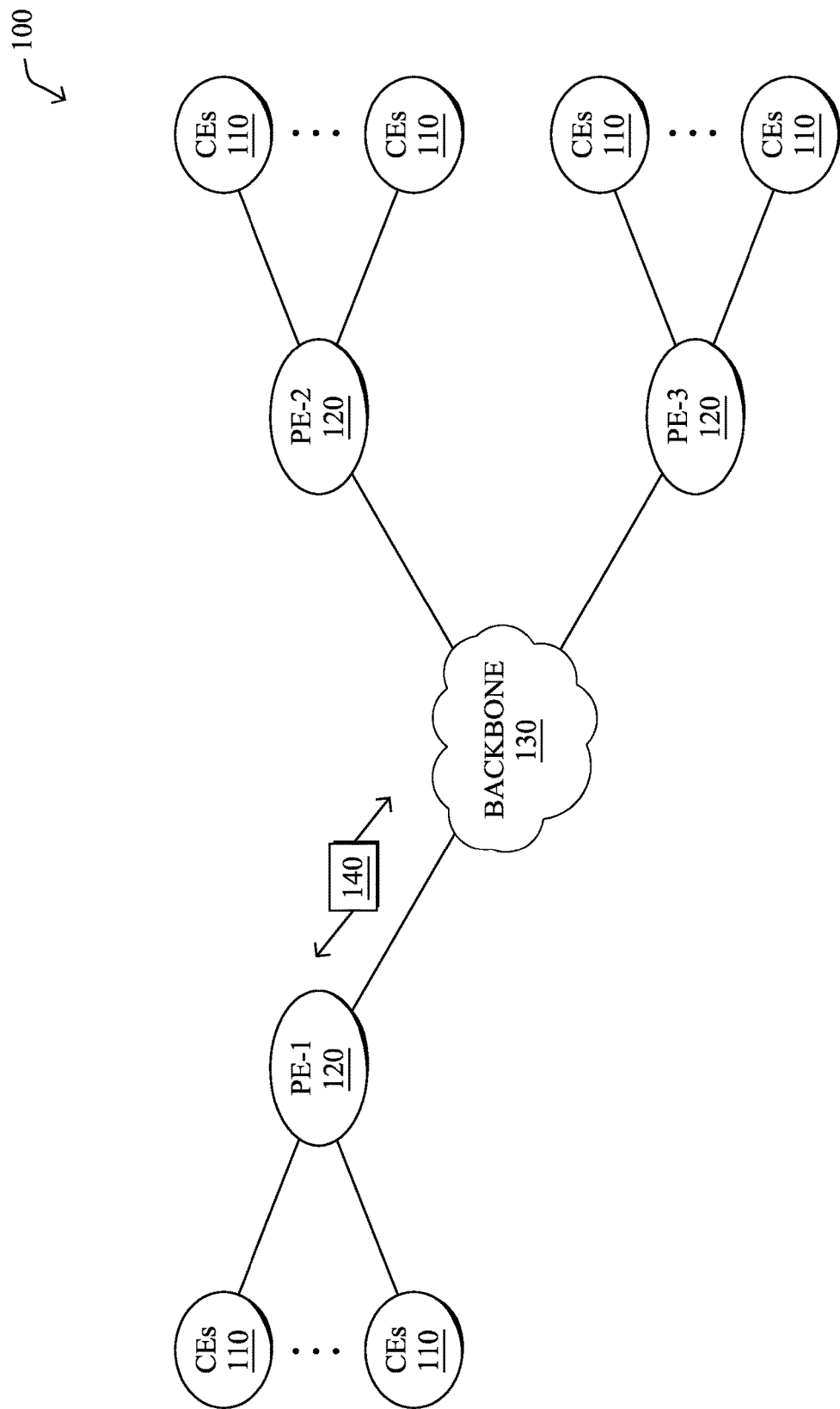
FIGS. 1A-1B illustrate an example communication network.

According to one or more embodiments of the disclosure, a device detects oscillations in a path metric for a network path between violating a service level agreement for an online application and not violating the service level agreement for the online application. The device classifies the oscillations as near-boundary or wild, based on degrees to which the path metric violated a threshold of the service level agreement. The device provides data regarding the oscillations to a user interface that includes an indication as to whether the oscillations are near-boundary or wild. The device adjusts the threshold of the service level agreement based in part on feedback from the user interface, when the oscillations are near-boundary.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B 1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
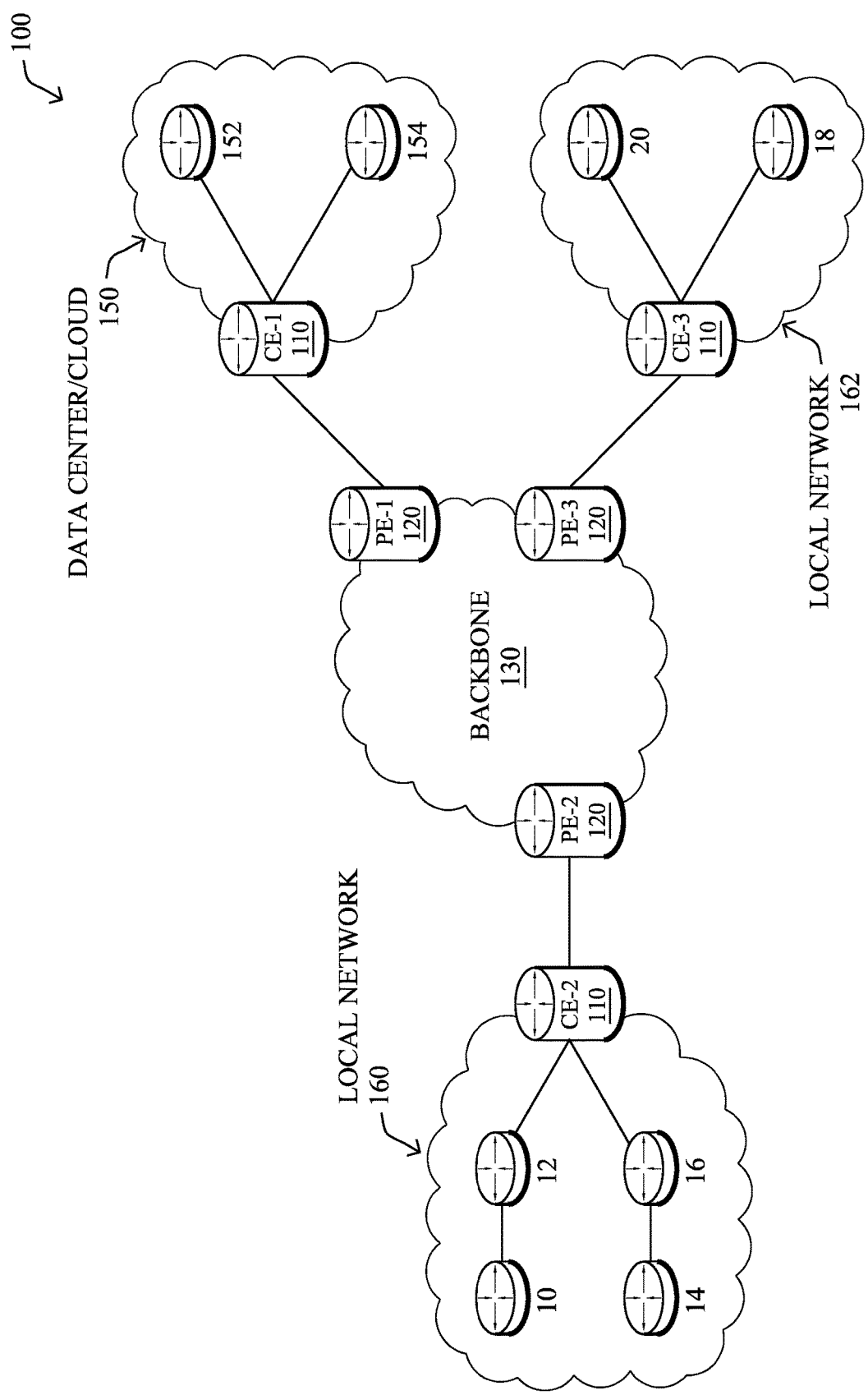

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
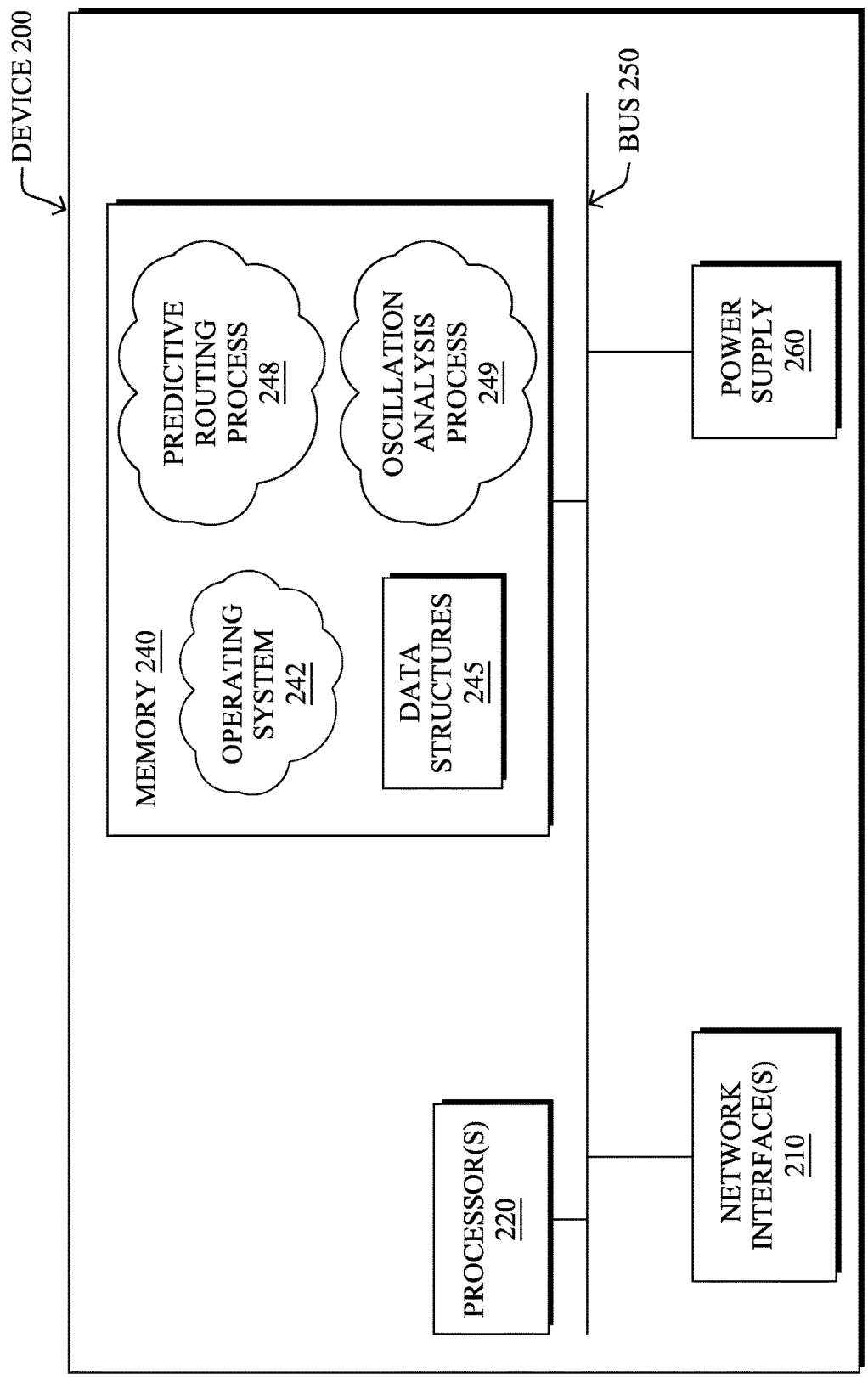
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or an oscillation analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or oscillation analysis process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or oscillation analysis process 249 may include computer executable instructions that, when executed by processor(s) 220, cause device 200 to perform the techniques described herein. To do so, in some embodiments, predictive routing process 248 and/or oscillation analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or oscillation analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or oscillation analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory KPI metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
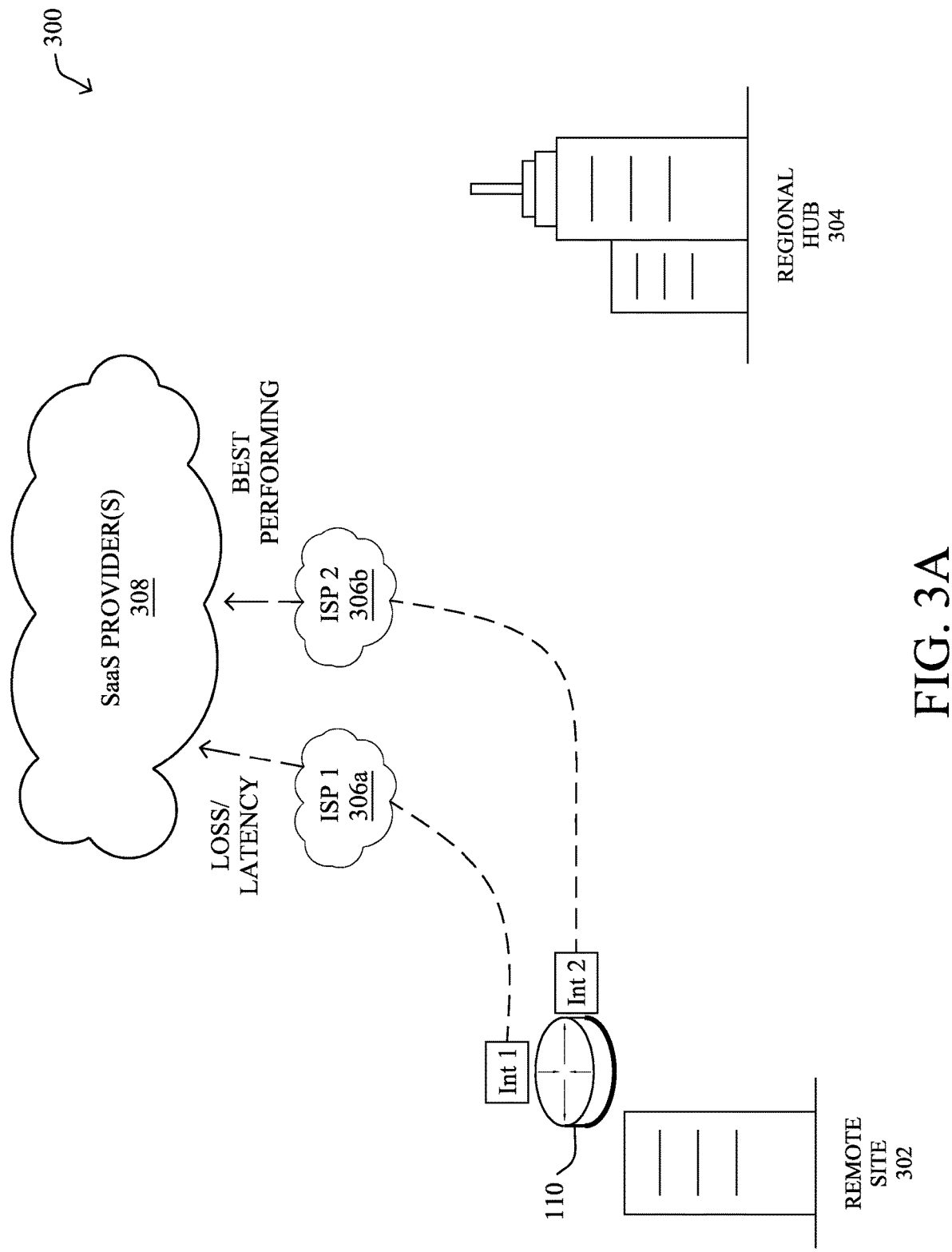
FIGS. 3A-3B illustrate example network deployments.
Figure 3B:
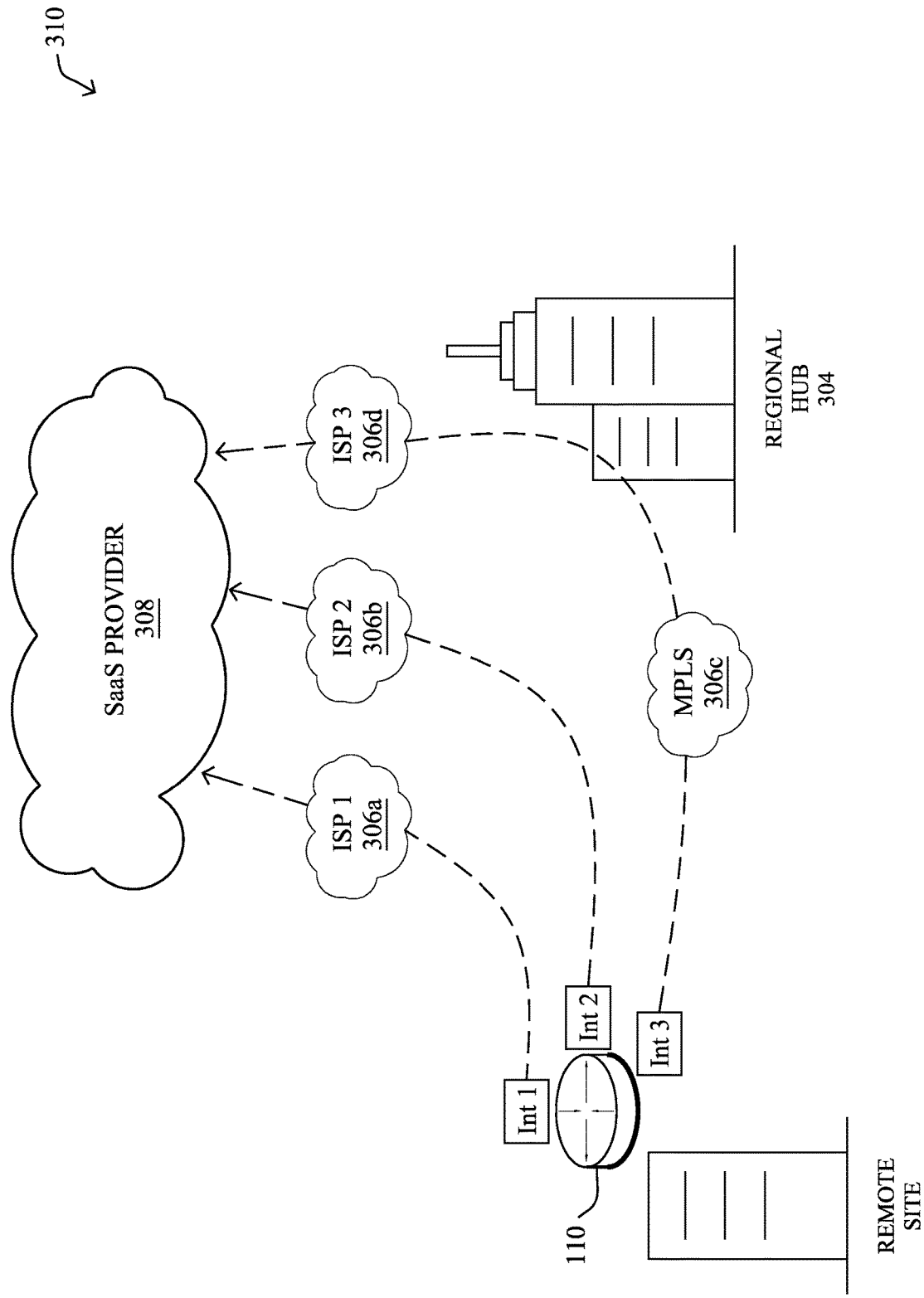

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
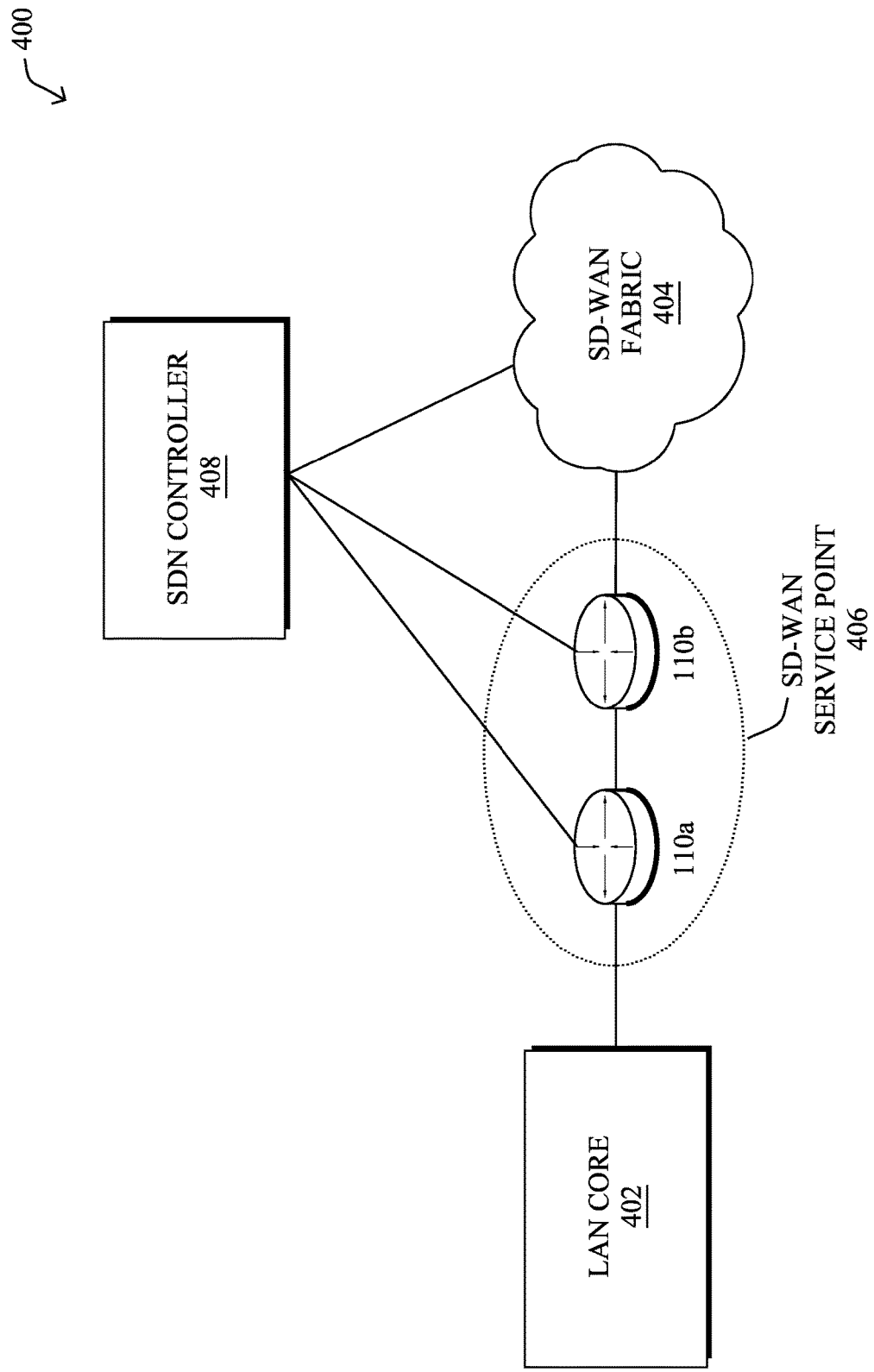
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;

Internet, MPLS. LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela. CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
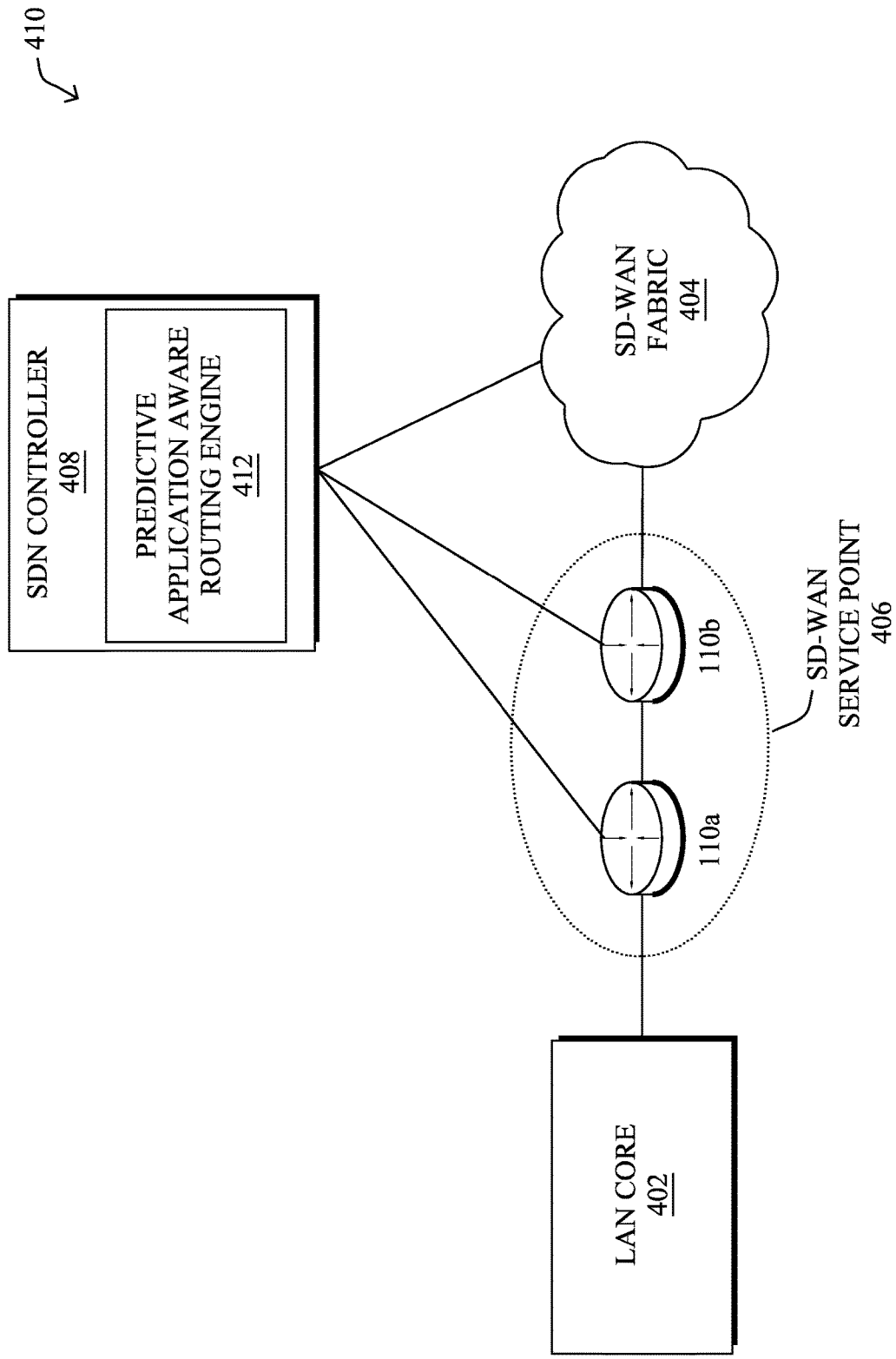

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, routing protocols are becoming more application aware. Several routing protocols, such as overlay routing protocols in SD-WANs, offer facilities such as Application Aware Routing (AAR), that allow an administrator to specify a service level agreement (SLA) for a particular type of application traffic. Typically, an SLA comprises one or more thresholds for the QoS metric(s) for the path, such as loss, latency, jitter, etc., that define a performance range for the path that is considered 'good' for the online application. By way of example, one potential SLA for a voice application may be as follows: loss ≤3%, two-way latency ≤300 ms, and jitter ≤50 ms. In a reactive routing scenario, if the path is deemed as not satisfying this SLA for the application, the path selection process may switch the path to one that respects the SLA, according to a manual template. Such a configuration enables administrators to configure different SLA thresholds for different applications. This greatly reduces the number of path changes that need to be applied by the routing protocol as an action is taken only when the paths fail to meet SLA thresholds.

More specifically, many network paths fall into one of two camps: 1.) paths that satisfy the SLA for the online application and 2.) paths that do not. It is quite easy for a routing protocol or network monitoring tool to differentiate such paths. Once the paths are distinguished from one another, the path selection process avoids using SLA-violating paths in favor of routing the application traffic via non-violating paths. Indeed, this is what reactive approaches, such as AAR, does today.

However, a challenge exists for both reactive and proactive routing approaches for paths that oscillate between violating an SLA and not violating that SLA. If the routing protocol does not prevent such oscillations in an intelligent manner, there will be consistent issues, since the routing protocol will keep switching paths leading to problems such as jitter, packet reordering, and the like, which can negatively impact the application experience.

Figure 5:
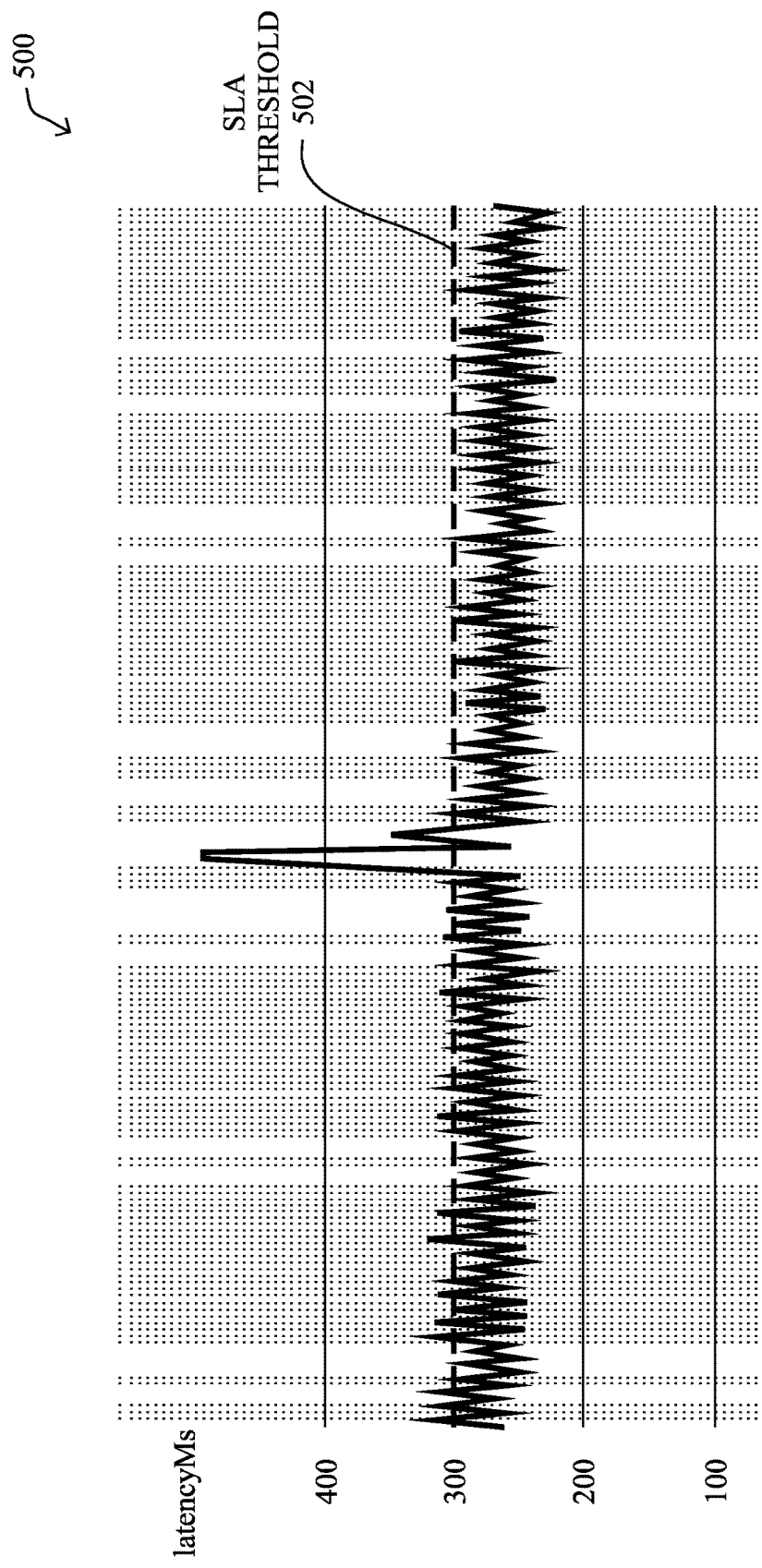
FIG. 5 illustrates an example plot of path latency over time.

By way of example, consider plot 500 in FIG. 5, which shows the latency of a network path over time. From plot 500, it can be seen that the latency hovers around 300 ms, where an SLA threshold 502 has been set. Here, the latency is sampled every ten minutes and occasionally crosses SLA threshold 502, thereby violating the SLA. When the latency is below the threshold, even by a small amount, the routing mechanism may decide to use the path to convey traffic for the online application associated with the SLA. However, since the probability of the latency crossing SLA threshold 502 is very high over time, the routing mechanism may then decide that the path is not suitable for the application traffic and switch to a different path. Thus, oscillations along the SLA threshold can lead to path oscillation, as well.

—Path Metric Oscillation Analysis with SLA Threshold Adjustment—

The techniques introduced herein introduce systems and methods to identify network paths with near-boundary oscillations for different applications. In some aspects, the techniques herein can be used to avoid frequent route switches, such as by intelligently altering the SLA thresholds for certain applications on some paths, in an effort to reduce the number of traffic reroutes and without sacrificing user experience. Further aspects of the techniques herein introduce alerting and visual interfaces that show the adjusted SLA thresholds, and the path behaviors for such decisions. In another aspect, the techniques herein can also be used to avoid oscillating paths for respective applications while observing whether such a change triggers a change of detection of 'bad' application SLA. In other words, the system may seek to answer the question "can the SLA threshold be adjusted to avoid oscillation while not avoiding triggering a path change in presence of application SLA failure?" Messaging mechanism are also introduced herein between a cloud-based routing engine and the routing protocol used by a router, to avoid using paths with near-boundary oscillations. Finally, the techniques herein also introduce mechanisms to monitor and trigger routing changes when a path suddenly starts to exhibit near-boundary oscillation.

Illustratively, the techniques described herein may be performed by hardware, software, and/or firmware, such as in accordance with oscillation analysis process 249, which may include computer executable instructions executed by the processor 220 (or independent processor of interfaces 210) to perform functions relating to the techniques described herein, such as in conjunction with the operation of predictive routing process 248.

Specifically, according to various embodiments, a device detects oscillations in a path metric for a network path between violating a service level agreement for an online application and not violating the service level agreement for the online application. The device classifies the oscillations as near-boundary or wild, based on degrees to which the path metric violated a threshold of the service level agreement. The device provides data regarding the oscillations to a user interface that includes an indication as to whether the oscillations are near-boundary or wild. The device adjusts the threshold of the service level agreement based in part on feedback from the user interface, when the oscillations are near-boundary.

Figure 6:
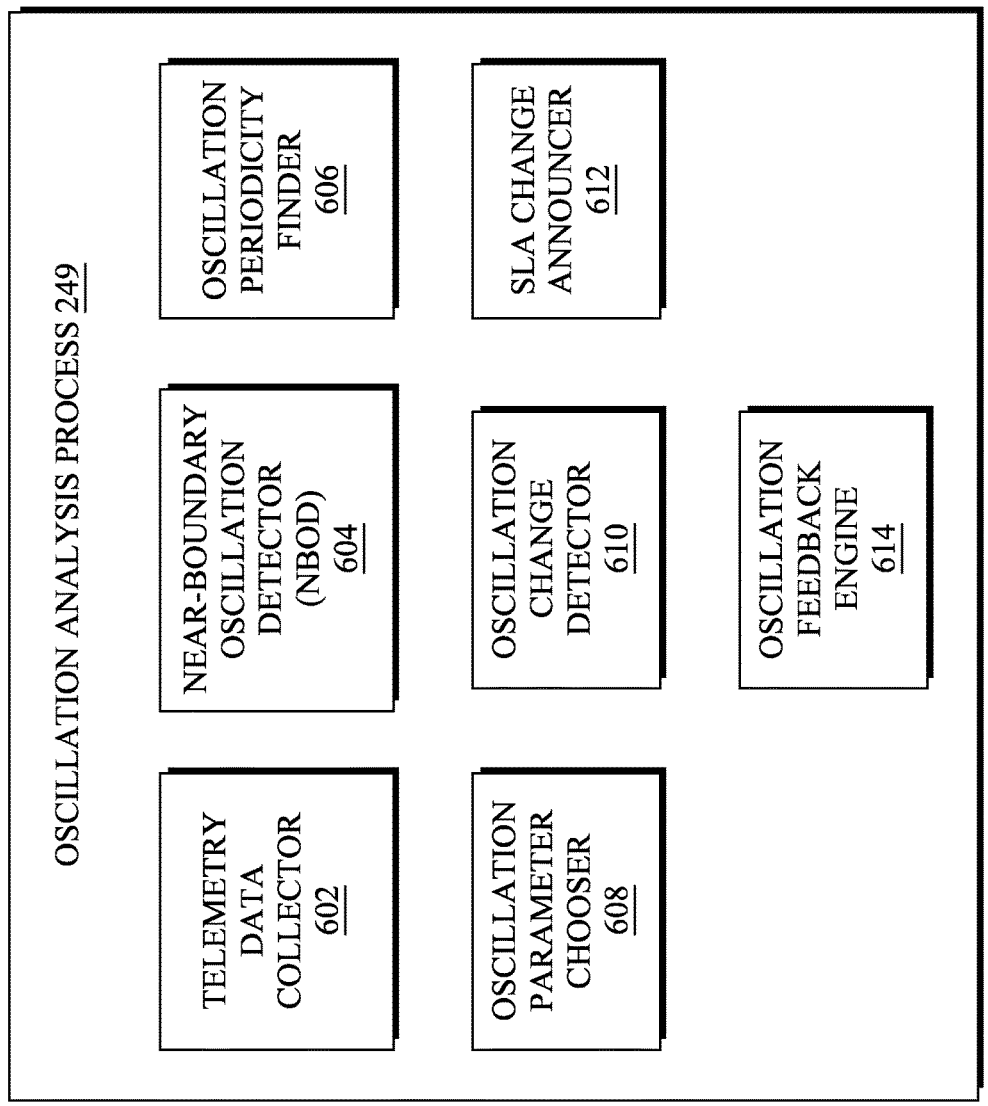
FIG. 6 illustrates an example architecture for analyzing path metric oscillations.

Operationally, in various embodiments, FIG. 6 illustrates an example architecture 600 for selecting paths for high predictability using clustering, according to various embodiments. At the core of architecture 600 is oscillation analysis process 249, which may be executed by a controller for a network, a networking device, or another device in communication therewith. For instance, oscillation analysis process 249 may be executed by a controller for a network (e.g., SDN controller 408 in FIGS. 4A-4B), a particular networking device in the network (e.g., a router, etc.), another device or service in communication therewith, or the like. In some embodiments, for instance, oscillation analysis process 249 may be used to implement a predictive application aware routing engine, such as predictive application aware routing engine 412, or another supervisory service for the network. In other embodiments, oscillation analysis process 249 may be used to implement a reactive routing approach in the network.

As shown, oscillation analysis process 249 may include any or all of the following components: a telemetry data collector 602, a near-boundary oscillation detector (NBOD) 604, an oscillation periodicity finder 606, an oscillation parameter chooser 608, an oscillation change detector 610, an SLA change announcer 612, and/or an oscillation feedback engine 614. As would be appreciated, the functionalities of these components may be combined or omitted, as desired (e.g., implemented as part of predictive routing process 248). In addition, these components may be implemented on a singular device or in a distributed manner, in which case the combination of executing devices can be viewed as their own singular device for purposes of executing oscillation analysis process 249.

During operation, telemetry data collector 602 may be configured to obtain various telemetry data regarding the paths in a network, such as their QoS or other path metrics. In various embodiments, telemetry data collector 602 may obtain such information from a datalake (e.g., a datalake on which predictive routing process 248 operates) or may collect such information, directly. For instance, telemetry data collector 602 may collect path telemetry data for a path regarding measured metrics such as loss, latency, jitter, etc., at a given frequency Fi for a period of time Ti along each path of interest Pi. This can be done either on a pull basis by sending a request to one or more networking devices for the telemetry data or on a push basis, where the telemetry data is sent to telemetry data collector 602, automatically. In one embodiment, telemetry could be gathered by telemetry data collector 602 using time based telemetry (streaming). In another embodiment, a (more exhaustive) data gathering campaign may be triggered by telemetry data collector 602 to gather a rich set of telemetry variables to a collection of routers in the network.

In yet another embodiment, the techniques herein may be limited to a specific set of paths (paths carrying a given set of (critical) applications, a high volume of traffic, etc.), as configured by a user. In addition, another function of telemetry data collector 602 may be to compute time series from the received path metrics for the various network paths.

If available, telemetry data collector 602 may also obtain telemetry data indicative of user satisfaction scores for a given online application whose traffic is routed via a particular path. For instance, the online application itself may include a mechanism that allows users to rate their satisfaction with the performance of the online application (e.g., rating a videoconference on a scale of 0-5 stars, etc.). In other instances, user satisfaction information can be captured through agents, polling mechanisms (e.g., email, text, etc.), or the like. Regardless, telemetry data collector 602 may access this information via an application programming interface (API) associated with the system responsible for capturing or reporting such information. Telemetry collector 602 may further obtain configuration or other information for the various paths, such as their SLA templates, their path types (e.g., business Internet, MPLS, public Internet, etc.), geographic information, service provider information, etc.

Another component of oscillation analysis process 249 is near-boundary oscillation detector (NBOD) 604, in various embodiments, which is responsible for detecting paths that have near-boundary oscillations for different applications. In various embodiments, NBOD 604 may receive a list of applications of interest and their SLA thresholds from a user interface (e.g., from a network administrator) and/or extract such information directly from the current configurations in the network. For example, Table 1 below shows example SLA thresholds that NBOD 604 may consider:

TABLE 1

| Application | Packet loss threshold | Latency threshold (two-way) | Jitter threshold |
| --- | --- | --- | --- |
| Voice apps | 3% | 300 ms | 50 ms |
| Sharepoint app | 3% | 300 ms | 300 ms |
| Go-to-meeting | 1% | 300 ms | 50 ms |

It is not necessary to always map path QoS metrics as a proxy for application experience and the application experience can be mapped to other telemetry, if available. For example, it can be mapped to feedback obtained from the application, such as concealment time measured at the codec's of voice application, user-provided satisfaction ratings, or any other score emitted by the application.

In various embodiments, NBOD 604 may detect paths with near-boundary oscillations using either or both of the following: fraction of oscillations and distribution of jumps, which are described below.

Fraction of oscillation for a path P, application A may be defined as follows:

$$\text{frac}_{(P,A)} = m_{(P,A)} / n$$

where $m_{(P,A)}$ is the number of oscillations for the path due to any QoS metric, and n is the number of time-steps of observation. Note that a path is said to be oscillating only if the path moves from SLA violating state to an SLA non-violating state, or vice-versa. This SLA violation can be due to any of the QoS metric. Similar to $\text{frac}_{(P,A)}$, one may also define if a particular QoS metric qos is oscillating around its threshold (for the KPI of interest specified for A); this can be denoted by $\text{frac}_{(P,voice,qos)}$.

While $\text{frac}_{(P,A)}$ quantifies how often a path metric for a path exhibits oscillations with respect to its SLA, it does not quantify how much the path selection oscillates. Indeed, near-boundary oscillations (e.g., an oscillation of around 20 ms in latency) can potentially be avoided by adjusting the SLA threshold(s). However, "wild" oscillations, such as those that exceed the SLA threshold by a certain amount (e.g., an oscillation of 1000 ms in latency) cannot be avoided by changing the SLA threshold since, no matter what reasonable SLA threshold is set, the path may still oscillate. Hence, it is also often necessary to quantify the amount of jumps in oscillation (e.g., the degrees to which the SLA thresholds are violated). Moreover, such wild oscillation should trigger path selection change.

A jump in QoS-Oscillation $\delta_{(P,A,qos)}(t)$ for a path P and application A at time t is defined as the absolute difference between QoS-metric qos at time (t−1) and t, if there is a QoS-Oscillation at t. At times when there is no QoS-oscillations, it is undefined, i.e., $\delta_{(P,A,qos)}(t) = |qos(t-1) - qos(t)|$, for all times t when there is a QoS-oscillation for a QoS metric qos. The jump measures how much did the QoS metric jump when it crossed the boundary. In some embodiments, based on the distribution of the jumps in the QoS metric(s), NBOD 604 may classify the oscillations for the path as falling into either of the following categories:

- Wild Oscillations: These are oscillations where the QoS metric usually jumps by a large amount. Such oscillations cannot be ignored by the routing protocol or the network administrator, since it has a large effect on the user experience.
- Near-boundary oscillations (NBOs): These are oscillations where the QoS metric varies slightly around the SLA thresholds.

Figure 7C:
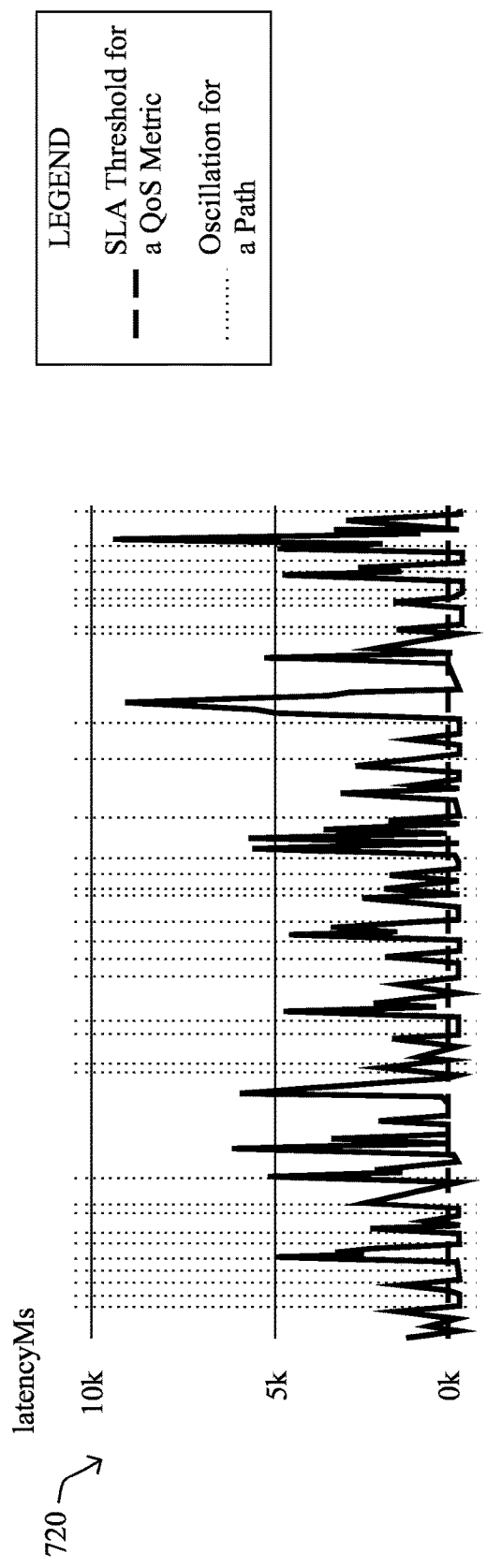
Figure 7D:
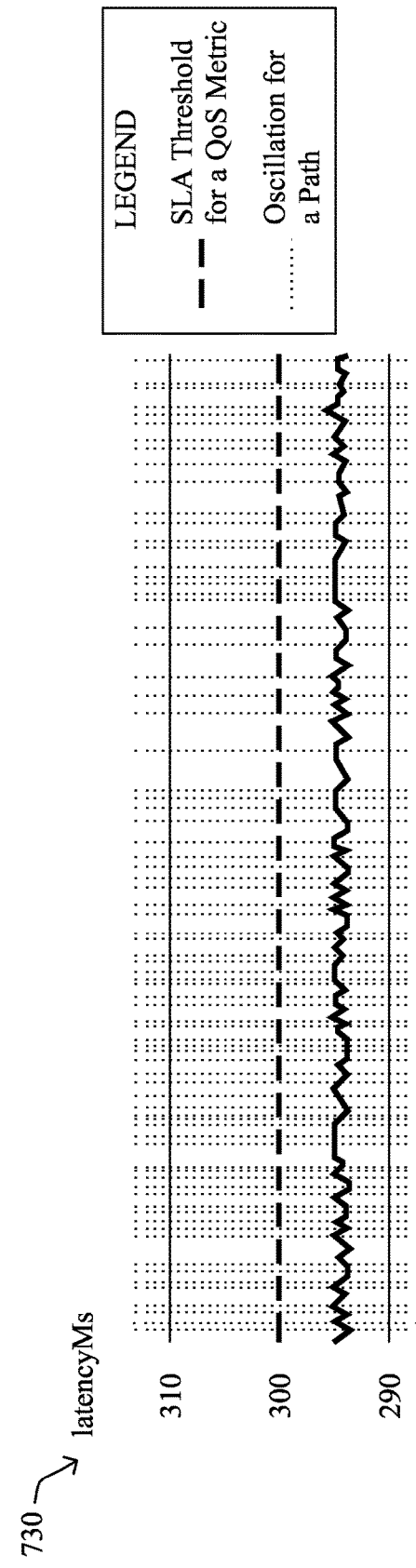
Figure 7E:
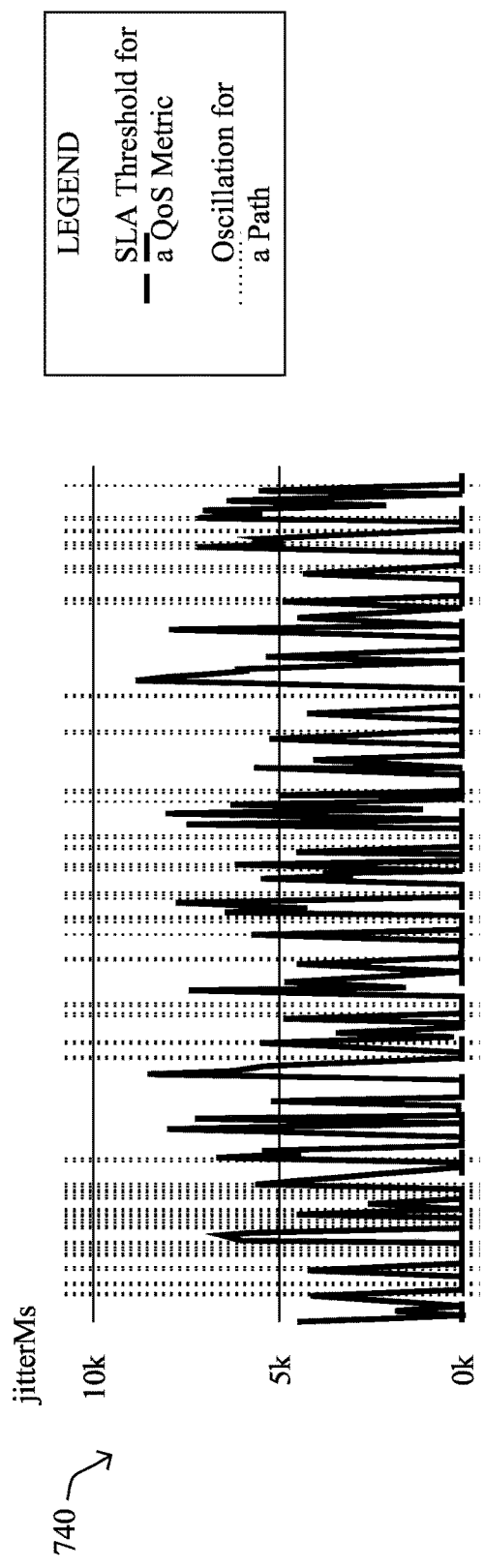
Figure 7F:
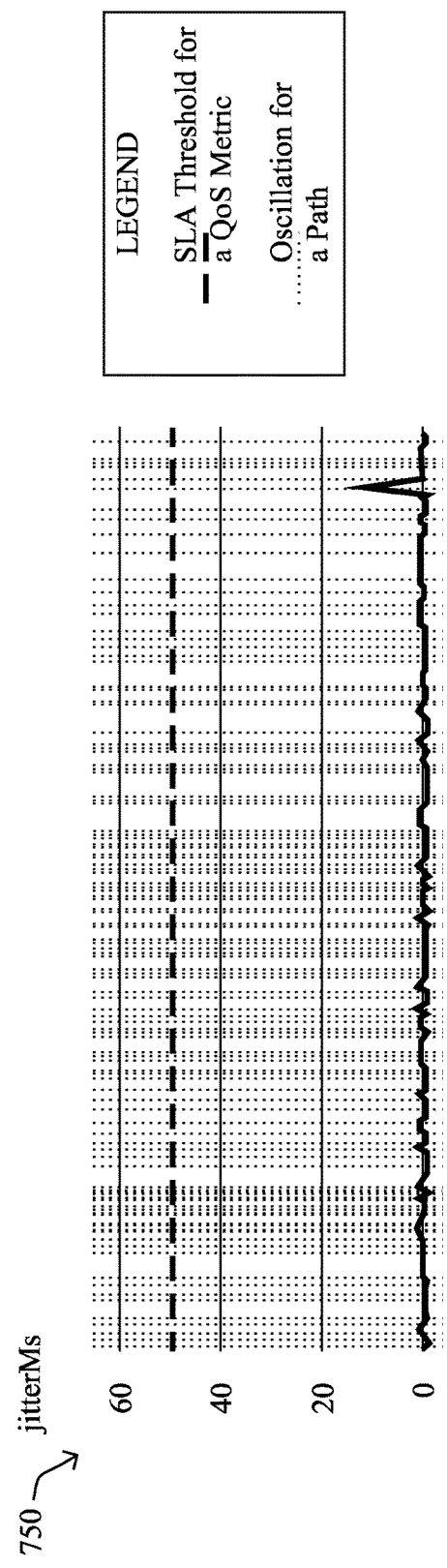

FIGS. 7A-7F illustrate plots of path metrics exhibiting near-boundary and wild behaviors, according to various embodiments. More specifically, FIG. 7A illustrates a plot 700 of the loss fraction of a path over time exhibiting wild oscillations. In contrast, FIG. 7B illustrates a plot 710 of the loss fraction of another path over time exhibiting NBOs. Similarly, FIG. 7C illustrates a plot 720 of the latency of a path over time exhibiting wild oscillations. In contrast, FIG. 7D illustrates a plot 730 of the latency of another path over time exhibiting NBOs. FIG. 7E illustrates a plot 740 of the jitter of a path over time exhibiting wild oscillations. Finally, FIG. 7F illustrates a plot 750 of jitter over time for a different path exhibiting NBOs.

Figure 8B:
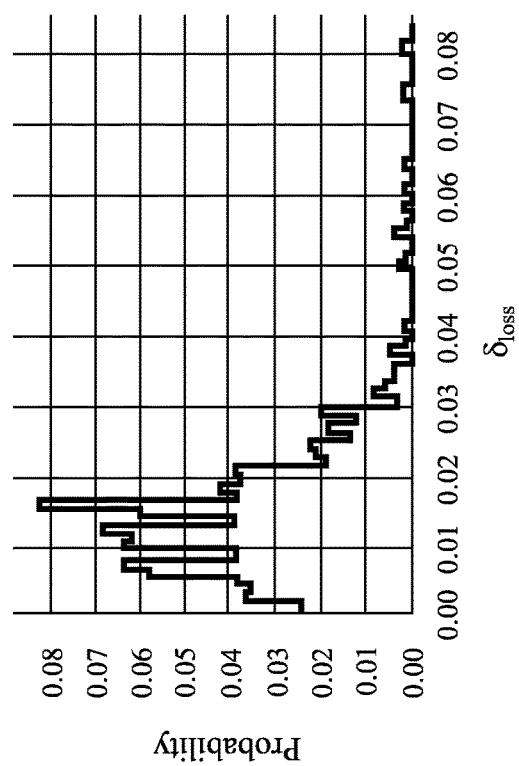
FIGS. 8A-8D illustrate plots of jump distributions for path metrics.
Figure 8A:
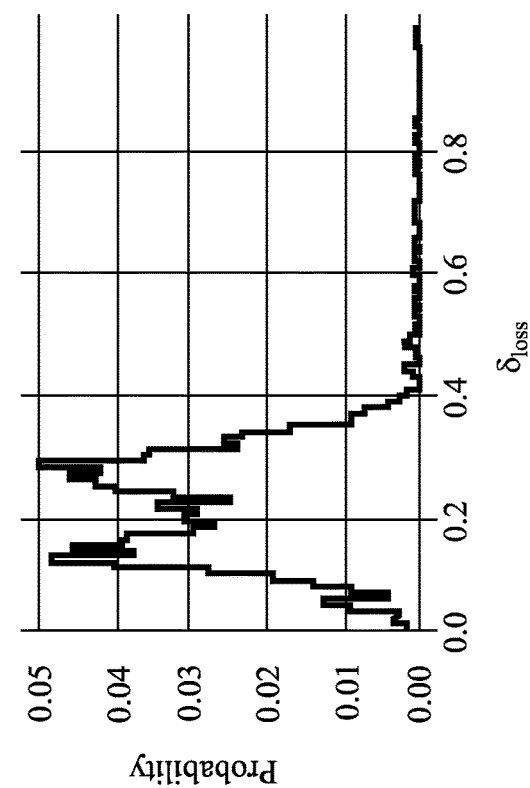
Figure 8D:
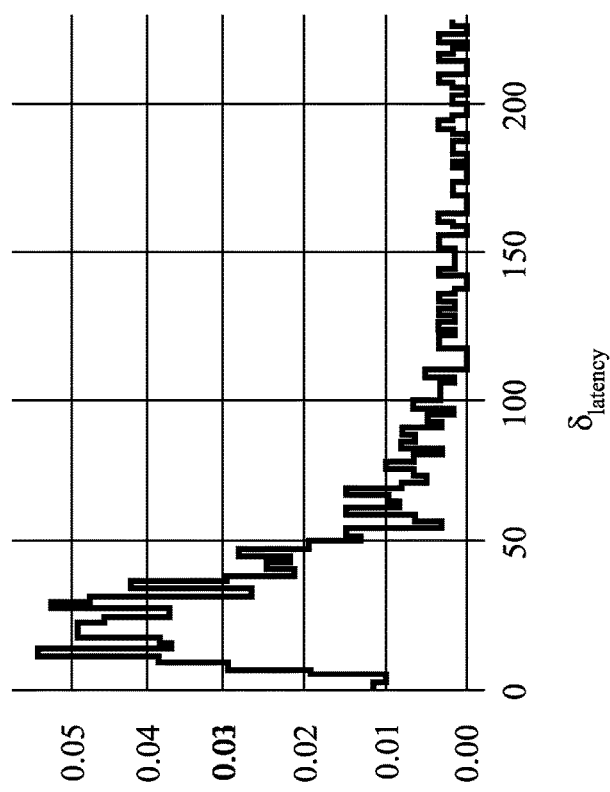
Figure 8C:
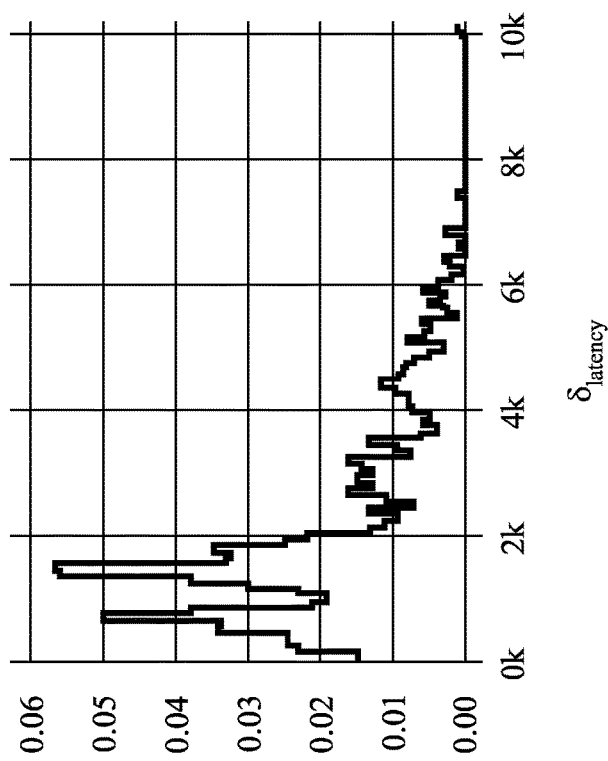

FIGS. 8A-8D illustrate plots of jump distributions for path metrics, in further embodiments. More specifically, plot 800 in FIG. 8A shows the jump distribution for a path exhibiting wild oscillations in its loss. In contrast, plot 810 in FIG. 8B shows the jump distribution for a path exhibiting NBOs in its loss. Plot 820 in FIG. 8C shows the jump distribution for a path exhibiting wild oscillations in its latency. Finally, plot 830 in FIG. 8D shows the jump distribution for a path exhibiting NBOs in its latency. From these plots, it can be seen that the mean jumps for the different path metrics varies significantly between those exhibiting wild behaviors and those exhibiting NBOs. Indeed, the mean jump from plot 800 is 12%, whereas the mean jump from plot 810 is only 1%. Similarly, the mean jump from plot 820 is 1300 ms in the wild case, whereas the mean jump from plot 830 is only 26 ms.

In another embodiment, the QoS metric may be predicted with uncertainty bounds using a regression machine-learning model. In turn, NBOD 604 may check the uncertainty bounds (e.g., 5% to 95% confidence bands) to determine whether the path is oscillating. For example, a path may be deemed as oscillating if the threshold falls within the 5%-95% confidence interval bands.

Referring again to FIG. 6, oscillation periodicity finder 606 may be responsible for determining whether a path oscillates periodically, in some embodiments. For instance, the jitter along a certain path may oscillate between violating its SLA and not violating the SLA between 10AM to 5 PM every weekday, but remain non-oscillating at other times. In one simple embodiment, oscillation periodicity finder 606 may analyze the oscillation for a given time period (e.g., each hour) and tag a path P as exhibiting NBO behavior for a given hour. This data can then be aggregated across days to find out whether the path periodicity exhibits such oscillations. For example, oscillation periodicity finder 606 may compute a binary time-series of 0 (if the path is not exhibiting NBO behavior) or 1 (if the path exhibits NBO behavior) for an hour. The periodicity of this time-series can be found by using, say, power spectral methods (e.g., Welch method). The periods of NBO behavior can then be used by oscillation periodicity finder 606 to tag the NBO time-periods of the path. In other embodiments, instead of a binary time-series, a continuous time-series where the NBO intensity (e.g., mean jump in one hour) could also be used to detect periods of NBOs.

In various embodiments, oscillation parameter chooser 608 may be responsible for providing data regarding the oscillations for display. To this end, oscillation parameter chooser 608 may implement a visual interface that allows a network administrator to view information about the various paths, their oscillation behaviors (e.g., NBOs, wild oscillations, etc.), the current SLA thresholds, and/or any recommended adjustments to the SLA thresholds.

Figure 9A:
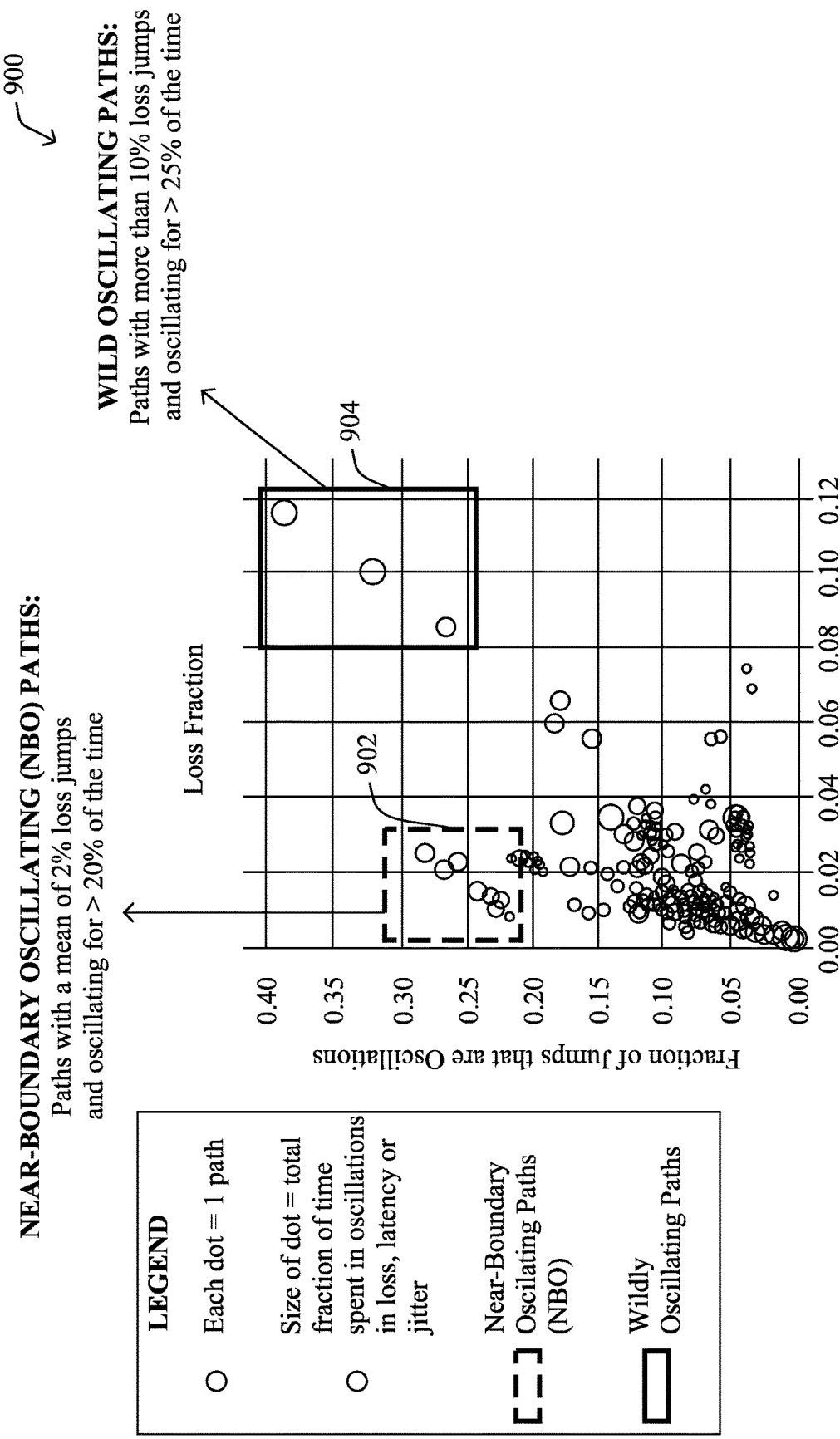
FIGS. 9A-9C illustrate plots of mean jump vs. fraction of jump that are oscillations for different path metrics.
Figure 9B:
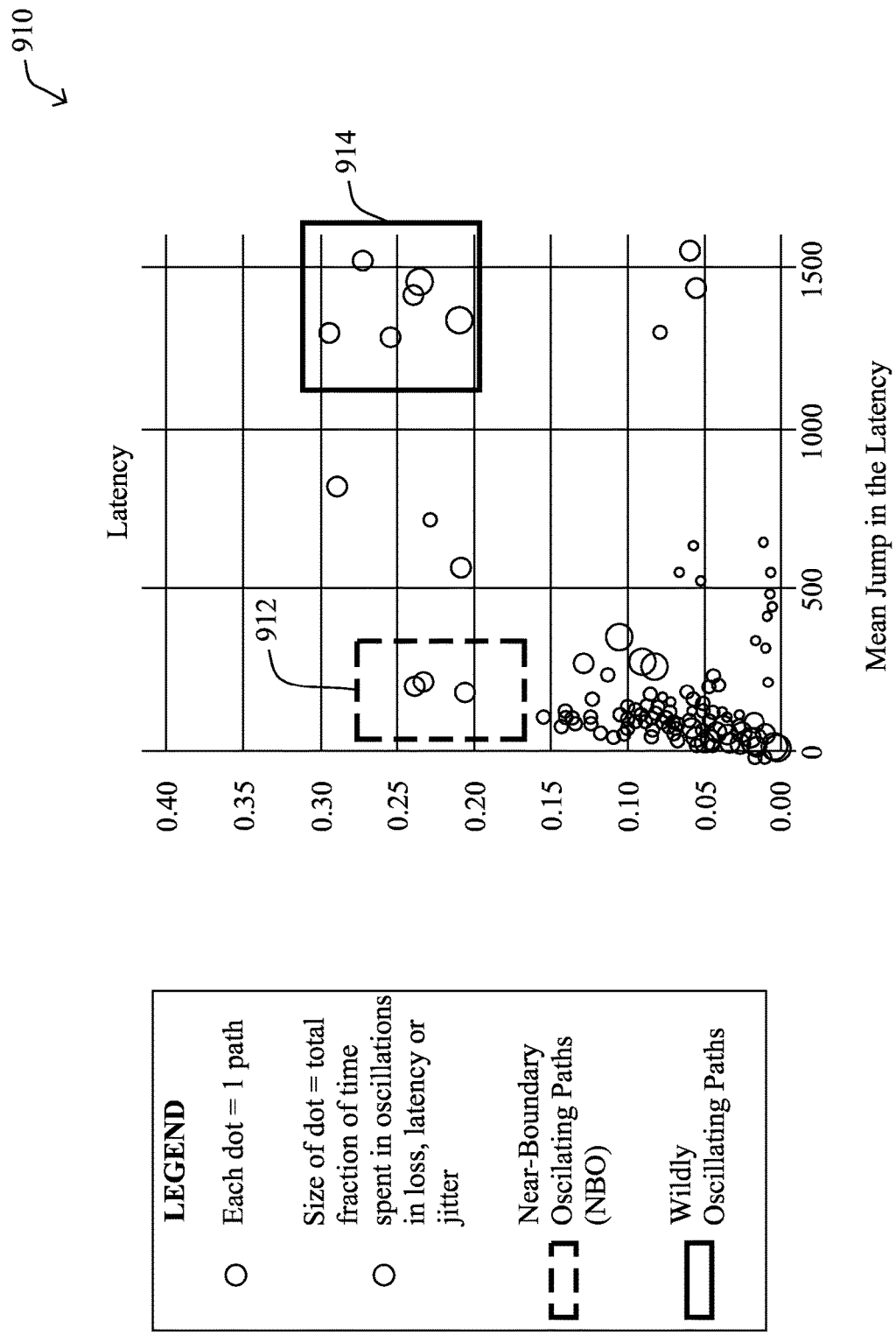
Figure 9C:
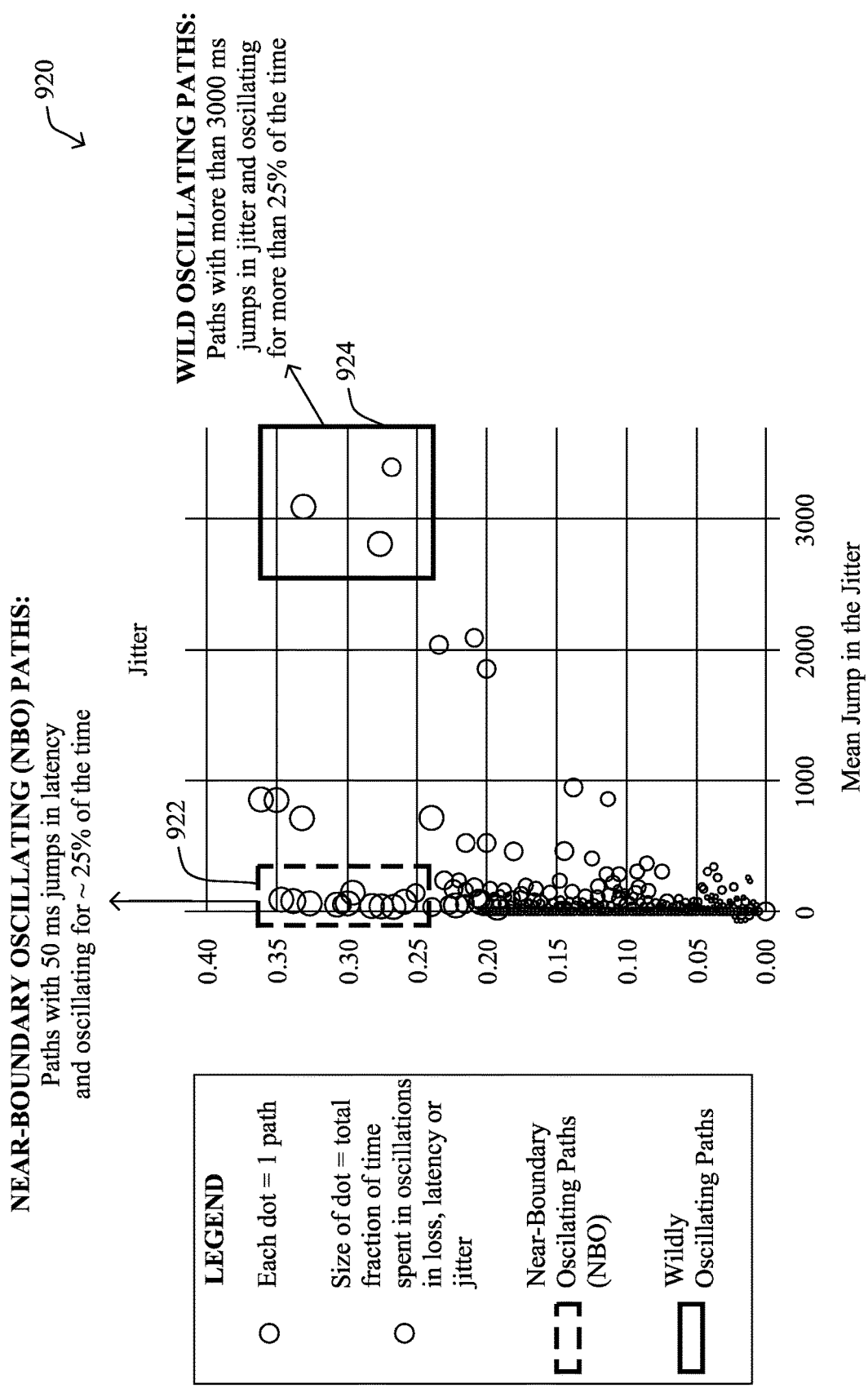

For instance, FIGS. 9A-9C illustrate plots of mean jump vs. fraction of jump that are oscillations for different path metrics, which could be presented for display to a user by oscillation parameter chooser 608. More specifically, FIG. 9A shows a scatter plot 900 of the fraction of jumps and mean jumps for the loss fraction of different paths in the network. Here, a certain group of paths 902 exhibit NBOs, based on plot 900, whereas another set of paths 904 exhibit wild oscillations. Similarly, FIG. 9B illustrates another example scatter plot 910, this time for the latencies of the different paths in the network, with a set of paths 912 exhibiting NBOs and another set of paths 914 exhibiting wild oscillations. Finally, FIG. 9C shows yet another such scatter plot 920, this time for the measured jitter along the various paths. As in the previous examples, plot 920 also clearly shows a set of paths 922 that exhibit NBO behaviors, as well as a set of paths 924 that exhibit wild oscillations.

Oscillation parameter chooser 608 may show plots such as those in FIG. 9A-9C, to a network administrator to allow them to select paths that have NBOs in their path metrics (e.g., by selecting paths 922 in FIG. 9A). In addition, oscillation parameter chooser 608 may be configured to automatically detect and suggest the NBO regions in plots such as those in FIGS. 9A-9C.

Once the paths are chosen, oscillation parameter chooser 608 may also show the current SLA threshold and/or a recommended SLA threshold for each selected path. Note that the QoS metric that is oscillating is also known and oscillation parameter chooser 608 may also allow the network administrator to choose an adjusted SLA threshold for those metric(s). For example, for each selected path exhibiting NBOs, oscillation parameter chooser 608 may show the current time-series of the QoS metrics, and the user can choose an SLA threshold that is not in the vicinity of oscillation. In other embodiments, oscillation parameter chooser 608 may use prediction and uncertainty bounds to automatically suggest an SLA violation threshold to the administrator, such as one that is outside the 1st or 99th percentile of uncertainty bounds.

In yet another embodiment, oscillation parameter chooser 608 may automatically cluster paths that have similar oscillation ranges. This can be done using a clustering algorithm such as DBSCAN or the like. Oscillation parameter chooser 608 can then collectively suggest or let the network administrator choose a suitable SLA threshold. Such embodiments help administrators that want one or only a few selected SLA templates.

Referring again to FIG. 6, oscillation analysis process 249 may also include oscillation change detector 610, which is responsible for monitoring and alerting paths that go from not exhibiting NBOs to exhibiting NBOs, or vice-versa, in various embodiments. In one embodiment, a time series where a path is deemed as having NBOs or not (e.g., wild oscillations) can be constructed in a manner similar to that of oscillation periodicity finder 606, described previously. In turn, oscillation change detector 610 may use an online or offline change-detection algorithm, such as ruptures package that semi-automatically detects changes, to assess such time series, to detect situations in which a path changes behavior to or from an NBO classification. If the path is determined to have changed to an NBO classification, then it may be observed for an additional duration (e.g., 2 more hours) before scatter plot 910 declares that a new NBO path has been found. Such a message can then be sent to SLA change announcer 612.

In various embodiments, SLA change announcer 612 may be responsible for informing the edge device(s) about paths that are oscillating and/or the new SLAs to be used. In one embodiment, the NBO paths and the respective thresholds (collated from NBOD 604 and oscillation parameter chooser 608) may be provided to the edge devices/routers or a controller overseeing their operations (e.g., an SDN controller). For example, SLA change announcer 612 may send a list of tuples <path, application, SLA thresholds> to the head and tail edge routers of the respective path using a custom message. Additional information such as the fraction of oscillations or jump distribution for each QoS metric can also be sent by SLA change announcer 612 for each path and application. In another embodiment the new proposed SLA template will provide an estimate of the expected reduction of the oscillations, should the user accept a recommended adjustment to an SLA threshold.

One of the major drawbacks of adjusting an SLA threshold is that application SLA failures could be missed. Indeed, by increasing a threshold, a path that used to be considered invalid will now be flagged as valid, thus avoiding a path selection trigger. Consequently, the application experience may suffer because of the relaxed condition on the SLA threshold. Accordingly, oscillation analysis process 249 may also include oscillation feedback engine 614 that evaluates whether the new threshold has an effect on the application SLA failure detection, in various embodiments.

Several feedback mechanisms may be used by oscillation feedback engine 614 to evaluate the impact of an SLA threshold adjustment. For example, oscillation feedback engine 614 may monitor the number of positive and negative user-provided feedback regarding their satisfaction with the online application (e.g., as is collected today in Microsoft O365). If the number of negative feedback reports increases after the threshold change, the decision may be revisited. In some instances, oscillation feedback engine 614 may provide the distribution of application feedback (degraded, bad, good) for review by an administrator, before and after the threshold change. If the distance between distributions (e.g., measured using for example a Kolmogorov-Smirnov distance) increases, oscillation feedback engine 614 may send a message to the user requesting a review of the decision to adjust the SLA threshold for that application, even at the cost of more path oscillations. For other applications, such as voice applications, oscillation feedback engine 614 may use the CODEC concealment time (CT) used to compute the Mean Opinion Score (MoS) value for the same purpose.

Alternatively, oscillation feedback engine 614 ma send the above data to a controller for relay to the edge router(s) affected. In response, the edge routers may configure their routing mechanisms to avoid NBO paths. Of course, if all available paths are in the NBO category, a decision may be made to send the packet over the least oscillating path (which can be computed from metrics such as fraction of oscillation, jump distribution, or oscillation behavior observed in the recent past).

In some embodiments, a corresponding oscillation feedback engine 614 may also be executed by an edge router and be responsible for monitoring the oscillation of NBO paths announced by SLA change announcer 612. From this, the oscillation feedback engine 614 of the router may indicate back to SLA change announcer 612 how the oscillating paths and alternate paths are performing. This is especially useful if user or path metrics deteriorate when using the recommendations. In one embodiment, oscillation feedback engine 614 monitors the oscillations around the new SLA thresholds for all of the NBO paths recommended. If the oscillations persist over the recommended SLA, it immediately reverts to original SLA threshold, and informs SLA change announcer 612 as to the ineffectiveness of the recommendation. In turn, SLA change announcer 612 may add such paths to a block-list and may avoid or readjust SLA thresholds based on the new data.

In summary, the techniques herein provide for oscillation detection and remediation for an application using path QoS and other telemetry, which can be pertinent to both reactive and predictive routing protocols. In some aspects, the techniques herein detect oscillations that lead to high-frequency route switching due to path QoS metrics hovering near the SLA thresholds, which is referred to herein as near-boundary oscillations. In further aspects, the techniques herein propose mechanisms to display such paths across the network to a network administrator via a user interface or the like. The techniques herein can also be used to suggest appropriate SLA thresholds, to avoid route switching, and custom messages may be sent to the edge routers, to enforce the adjusted SLA thresholds and avoid rerouting of the traffic. Further aspects of the techniques herein are also able to detect and remediate against periodic oscillations and change points where a path that did not have oscillation start to oscillate, while observing whether such changes have an impact on the detection of application SLA failures. Such a mechanism can be greatly beneficial for reactive routing protocols, in particular, which usually do not consider long-term oscillation behavior. Of course, doing so is also useful for predictive routing engines, so as to avoid recommending too many reroutes.

Figure 10:
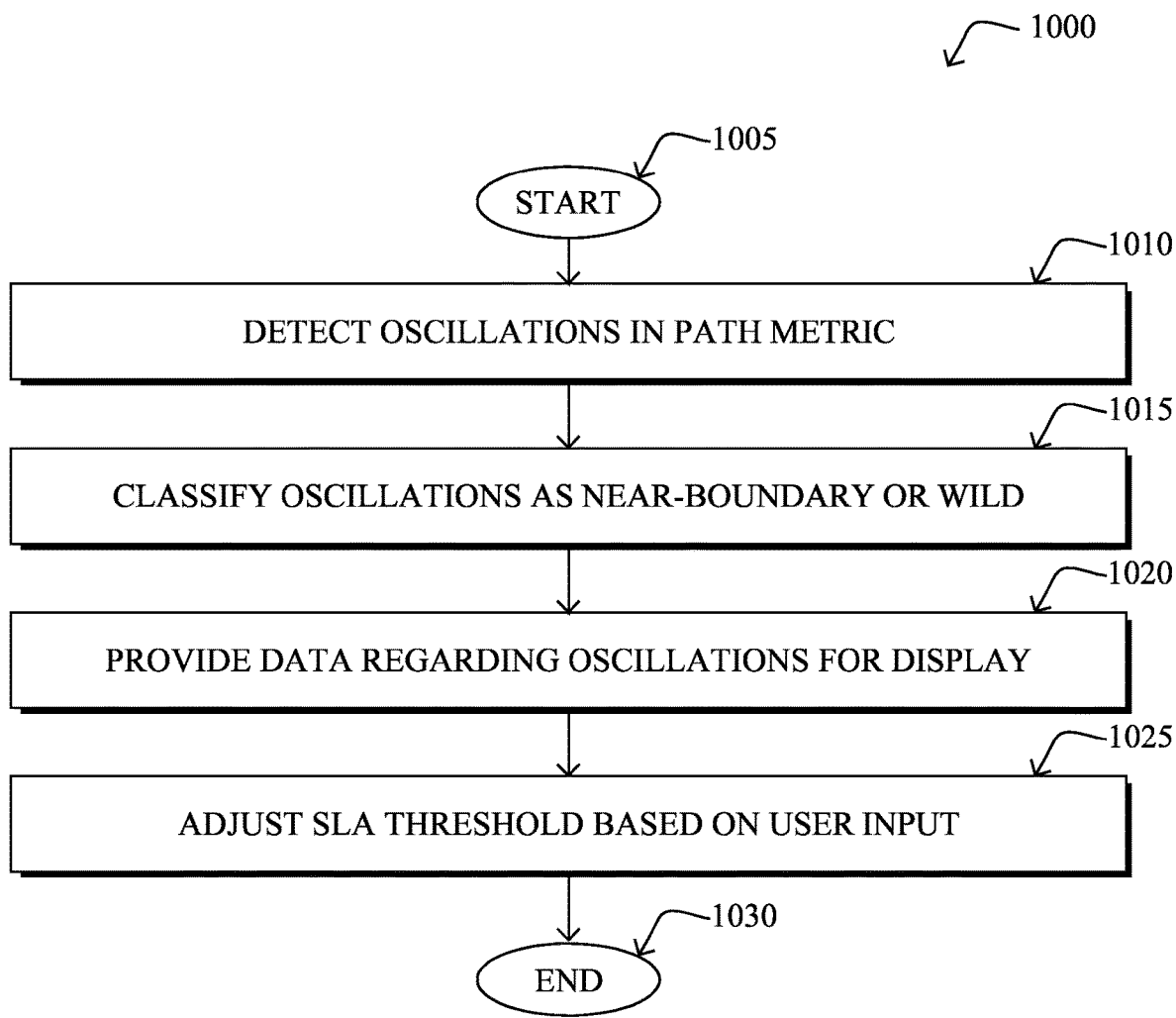
FIG. 10 illustrates an example simplified procedure for path metric oscillation analysis with service level agreement (SLA) threshold adjustment.

FIG. 10 illustrates an example simplified procedure 1000 (e.g., a method) for path metric oscillation analysis with service level agreement (SLA) threshold adjustment, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 1000 by executing stored instructions (e.g., oscillation analysis process 249). The procedure 1000 may start at step 1005, and continues to step 1010, where, as described in greater detail above, the device may detect oscillations in a path metric for a network path between violating an SLA for an online application and not violating the SLA for the online application. For instance, the online application may be a SaaS application. In various embodiments, the path metric comprises at least one of: packet loss, delay, or jitter.

At step 1015, as detailed above, the device may classify the oscillations as near-boundary or wild, based on degrees to which the path metric violated a threshold of the SLA. In some embodiments, the device classifies the oscillations as near-boundary or wild, based in part on a distribution of the degrees to which the path metric violated the threshold of the SLA. In another embodiment, the device classifies the oscillations as near-boundary or wild, based in part on mean or fraction of the degrees to which the path metric violated the threshold of the SLA. In yet another embodiment, the device may also determine whether the oscillations are periodically near-boundary. In turn, the device may periodically adjust the threshold of the SLA when the oscillations are periodically near-boundary.

At step 1020, the device may provide data regarding the oscillations to a user interface that includes an indication as to whether the oscillations are near-boundary or wild, as described in greater detail above. In various embodiments, the data regarding the oscillations include a recommended threshold for the SLA and the feedback from the user interface comprises an acceptance of that threshold. In an additional embodiment, the device may cluster the network path with other networks paths that exhibit similar oscillations in their path metric as that of the network path into a cluster of paths and include an indication of that cluster of paths in the data regarding the oscillations.

At step 1025, as detailed above, the device may adjust the threshold of the SLA based in part on feedback from the user interface, when the oscillations are near-boundary. In some embodiments, the device may also monitor the network path for oscillations in the path metric, after the threshold of the SLA has been adjusted. By doing so, the device may revert the adjustment to the threshold of the SLA, block the network path from being used to convey traffic for the online application, or take other corrective actions. In other embodiments, the device may cause a router to avoid sending traffic for the online application via the network path, when the oscillations are wild oscillations. Procedure 1000 then end at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for path metric oscillation analysis with SLA threshold adjustment, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    detecting, by a device, oscillations in a path metric for a network path between violating a service level agreement for an online application and not violating the service level agreement for the online application;
    classifying, by the device, the oscillations as near-boundary or wild, based on degrees to which the path metric violated a threshold of the service level agreement;
    providing, by the device, data regarding the oscillations to a user interface that includes an indication as to whether the oscillations are near-boundary or wild; and
    adjusting, by the device, the threshold of the service level agreement based in part on feedback from the user interface, when the oscillations are near-boundary.

2. The method as in claim 1, wherein the path metric comprises at least one of: packet loss, delay, or jitter.

3. The method as in claim 1, wherein the device classifies the oscillations as near-boundary or wild, based in part on a distribution of the degrees to which the path metric violated the threshold of the service level agreement.

4. The method as in claim 1, wherein the device classifies the oscillations as near-boundary or wild, based in part on mean or fraction of the degrees to which the path metric violated the threshold of the service level agreement.

5. The method as in claim 1, wherein the data regarding the oscillations comprises a recommended threshold for the service level agreement, and wherein the feedback from the user interface comprises an acceptance of that threshold.

6. The method as in claim 1, further comprising:
    monitoring, the device, the network path for oscillations in the path metric, after the threshold of the service level agreement has been adjusted.

7. The method as in claim 1, wherein classifying the oscillations as near-boundary or wild comprises:
    determining whether the oscillations are periodically near-boundary, wherein the device periodically adjusts the threshold of the service level agreement when the oscillations are periodically near-boundary.

8. The method as in claim 1, further comprising:
    causing a router to avoid sending traffic for the online application via the network path, when the oscillations are wild oscillations.

9. The method as in claim 1, further comprising:
    clustering the network path with other networks paths that exhibit similar oscillations in their path metric as that of the network path into a cluster of paths, wherein the data regarding the oscillations include an indication of that cluster of paths.

10. The method as in claim 1, wherein the online application is a software-as-a-service (SaaS) application.

11. An apparatus, comprising:
    one or more network interfaces;
    a processor coupled to the one or more network interfaces and configured to execute one or more processes; and
    a memory configured to store a process that is executable by the processor, the process when executed configured to:
        detect oscillations in a path metric for a network path between violating a service level agreement for an online application and not violating the service level agreement for the online application;
        classify the oscillations as near-boundary or wild, based on degrees to which the path metric violated a threshold of the service level agreement;
        provide data regarding the oscillations to a user interface that includes an indication as to whether the oscillations are near-boundary or wild; and
        adjust the threshold of the service level agreement based in part on feedback from the user interface, when the oscillations are near-boundary.

12. The apparatus as in claim 11, wherein the path metric comprises at least one of: packet loss, delay, or jitter.

13. The apparatus as in claim 11, wherein the apparatus classifies the oscillations as near-boundary or wild, based in part on a distribution of the degrees to which the path metric violated the threshold of the service level agreement.

14. The apparatus as in claim 11, wherein the apparatus classifies the oscillations as near-boundary or wild, based in part on mean or fraction of the degrees to which the path metric violated the threshold of the service level agreement.

15. The apparatus as in claim 11, wherein the data regarding the oscillations comprises a recommended threshold for the service level agreement, and wherein the feedback from the user interface comprises an acceptance of that threshold.

16. The apparatus as in claim 11, wherein the process when executed is further configured to:
    monitor the network path for oscillations in the path metric, after the threshold of the service level agreement has been adjusted.

17. The apparatus as in claim 11, wherein the apparatus classifies the oscillations as near-boundary or wild by:
    determining whether the oscillations are periodically near-boundary, wherein the apparatus periodically adjusts the threshold of the service level agreement when the oscillations are periodically near-boundary.

18. The apparatus as in claim 11, wherein the process when executed is further configured to:
    cause a router to avoid sending traffic for the online application via the network path, when the oscillations are wild oscillations.

19. The apparatus as in claim 11, wherein the process when executed is further configured to:
    cluster the network path with other networks paths that exhibit similar oscillations in their path metric as that of the network path into a cluster of paths, wherein the data regarding the oscillations include an indication of that cluster of paths.

20. A tangible, non-transitory, computer-readable medium storing program instructions that cause a device to execute a process comprising:
    detecting, by the device, oscillations in a path metric for a network path between violating a service level agreement for an online application and not violating the service level agreement for the online application;
    classifying, by the device, the oscillations as near-boundary or wild, based on degrees to which the path metric violated a threshold of the service level agreement;
    providing, by the device, data regarding the oscillations to a user interface that includes an indication as to whether the oscillations are near-boundary or wild; and
    adjusting, by the device, the threshold of the service level agreement based in part on feedback from the user interface, when the oscillations are near-boundary.

* * * * *

UNITED STATES PATENT AND TRADEMARK OFFICE
CERTIFICATE OF CORRECTION

PATENT NO. : 11,522,787 B1
APPLICATION NO. : 17/538214
DATED : December 6, 2022
INVENTOR(S) : Vinay Kumar Kolar et al.

Page 1 of 1

It is certified that error appears in the above-identified patent and that said Letters Patent is hereby corrected as shown below:

In the Specification

Column 7, Line 67, please amend as shown:
networking technologies (e.g., public Internet, MPLS (with Column 9, Line 1, please amend as shown:
Internet, MPLS, LTE transports providing highly varying Column 9, Line 14, please amend as shown:
made to extend the notion of routing, CSPF, link state Column 9, Line 31, please amend as shown:
Modern SaaS solutions like Viptela, CloudonRamp SaaS, Column 14, Line 53, please amend as shown:
its SLA and not violating the SLA between 10AM to 5 PM Signed and Sealed this
Twenty-eighth Day of February, 2023

Katherine Kelly Vidal
*Director of the United States Patent and Trademark Office*